US011297377B2

(12) United States Patent
Saxena

(10) Patent No.: US 11,297,377 B2
(45) Date of Patent: Apr. 5, 2022

(54) PASSIVE DATA COLLECTION FROM THIRD-PARTY CHANNEL APPLICATIONS

(71) Applicant: Roku, Inc., Los Gatos, CA (US)

(72) Inventor: Samir Saxena, Mountain View, CA (US)

(73) Assignee: Roku, Inc., San Jose, CA (US)

( * ) Notice: Subject to any disclaimer, the term of this patent is extended or adjusted under 35 U.S.C. 154(b) by 130 days.

(21) Appl. No.: 16/812,621

(22) Filed: Mar. 9, 2020

(65) Prior Publication Data

US 2020/0382827 A1     Dec. 3, 2020

Related U.S. Application Data

(63) Continuation of application No. 16/524,969, filed on Jul. 29, 2019, now abandoned, which is a continuation of application No. 14/536,463, filed on Nov. 7, 2014, now Pat. No. 10,368,121.

(51) Int. Cl.
| | |
|---|---|
| *H04N 21/431* | (2011.01) |
| *H04N 21/442* | (2011.01) |
| *H04N 21/436* | (2011.01) |
| *H04N 21/482* | (2011.01) |
| *H04N 21/443* | (2011.01) |
| *H04N 21/658* | (2011.01) |
| *G06F 11/34* | (2006.01) |

(52) U.S. Cl.
CPC ..... *H04N 21/4316* (2013.01); *G06F 11/3438* (2013.01); *G06F 11/3476* (2013.01); *H04N 21/43615* (2013.01); *H04N 21/4424* (2013.01); *H04N 21/4431* (2013.01); *H04N 21/4437* (2013.01); *H04N 21/44204* (2013.01); *H04N 21/44222* (2013.01); *H04N 21/6582* (2013.01); *H04N 21/482* (2013.01); *H04N 21/6581* (2013.01)

(58) Field of Classification Search
CPC ......... H04N 21/4316; H04N 21/43615; H04N 21/44204; H04N 21/44222; H04N 21/4424; H04N 21/4431; H04N 21/4437; H04N 21/6582; H04N 21/482; H04N 21/6581; G06F 11/3438; G06F 11/3476
See application file for complete search history.

(56) References Cited

U.S. PATENT DOCUMENTS

| | | | |
|---|---|---|---|
| 8,626,670 | B2 | 1/2014 | New et al. |
| 8,949,873 | B1 | 2/2015 | Bayer |
| 9,026,619 | B2 | 5/2015 | Lee et al. |

(Continued)

*Primary Examiner* — Nathan J Flynn
*Assistant Examiner* — Christine A Kurien
(74) *Attorney, Agent, or Firm* — Sterne, Kessler, Goldstein & Fox P.L.L.C.

(57) ABSTRACT

Disclosed herein are system, method, and computer-readable storage-medium embodiments for implementing passive data collection from third-party channel applications. An embodiment includes running a channel application of a first layer of an operating system, and receiving an application programming interface (API) call, from the channel application, for a module of a second layer of the operating system. The module may be a non-video playback module that includes graphic rendering logic, for example. Some embodiments may further include intercepting metadata sent to the module, determining identifying information of a content instance based on the intercepted metadata, and storing the determined identifying information of the content instance.

20 Claims, 12 Drawing Sheets

(56) References Cited

U.S. PATENT DOCUMENTS

| | | |
|---|---|---|
| 9,131,253 B2 | 9/2015 | Krikorian et al. |
| 10,368,121 B2 | 7/2019 | Saxena |
| 2004/0179262 A1 | 9/2004 | Harman et al. |
| 2006/0085812 A1 | 4/2006 | Shishegar et al. |
| 2008/0244682 A1 | 10/2008 | Sparrell et al. |
| 2009/0063613 A1 | 3/2009 | Chijiiwa et al. |
| 2012/0079518 A1 | 3/2012 | Wan et al. |
| 2013/0128120 A1 | 5/2013 | Chanda |
| 2014/0082682 A1 | 3/2014 | Choi et al. |
| 2014/0229970 A1 | 8/2014 | Besehanic |
| 2014/0282655 A1 | 9/2014 | Roberts |
| 2015/0128162 A1 | 5/2015 | Ionescu |
| 2016/0134924 A1 | 5/2016 | Saxena |

PASSIVE DATA COLLECTION FROM THIRD-PARTY CHANNEL APPLICATIONS

CROSS-REFERENCE TO RELATED APPLICATIONS

This application is a continuation of U.S. patent application Ser. No. 16/524,969, filed Jul. 29, 2019 (abandoned Mar. 9, 2020, after filing of this application), which is a continuation of U.S. patent application Ser. No. 14/536,463, filed Nov. 7, 2014 (now U.S. Pat. No. 10,368,121, issued Jul. 30, 2019), the entirety of which are incorporated herein by reference.

FIELD

Various embodiments of the invention relate to systems and methods for collecting information about television programs.

BACKGROUND

The number of television programs available to users have dramatically increased over the years. Today there are numerous streaming services that offer thousands of video on demand (VOD) programs. Even traditional cable networks like ABC, CBS, and NBC have started their own streaming services in their efforts to capture the users' attention and loyalty. In addition to all of the available VOD programs, there are also numerous broadcast programs that are available to the users. Consequently, users now face a sea of readily available programs in which they have to wade through in order to find something to watch. One way to help users discover programs to enjoy is to provide useful data analytics such as most watched programs, currently trending programs, number of current viewers, etc.

One of the most used methods for obtaining viewing data (i.e., what the user is current watching) is to execute a direct query to the user device. However, in an open development environment, this method is not always available due to the lack of control of third party channels. Accordingly, an alternative and accurate method is needed for collecting viewing data.

SUMMARY OF THE INVENTION

An improved data collection method/system is described herein. The method/system is configured to collect viewing data by using both active and passive data collection methods. The passive data collection method involves collecting and analyzing existing data sent by a channel application to a rendering function/engine residing on the operating system of the user's device. The passive data collection method includes: running a channel application located on a first layer of an operating system of a user device; receiving an application interface (API) call, from the channel application, for a graphic rendering module located on a second layer of the operating system, wherein the graphic rendering module is a non-video playback module; intercepting metadata sent to the graphic rendering module; determining identifying information of a content based on the intercepted metadata; and storing the determined identifying information of the content.

The graphic rendering module may comprise graphic rendering library components residing in the runtime/layer (just below the application framework layer, which is below the application layer). In one aspect, a graphic rendering library component may comprise BrightScript components such as roSpringboardScreen, roVideoScreen, and roImageCanvas. In another aspect, the graphic rendering module is a DirectFB module (direct frame buffer) or an OpenGL module.

The method further includes sending the intercepted metadata to a remote server and determining the identifying information of the content at the remote server. The identifying information may be a unique identifier that uniquely identifies the content. Additionally, the method may include: receiving a user selection to play the content; receiving an API call, from the channel application, for a multimedia playback module to play the selected content; receiving a data stream for the selected content from a media server; and rendering one or more of the metadata sent to the graphic rendering module on a display screen using the graphic rendering module prior to the multimedia playback module playing the received data stream. It should be noted that a graphic rendering module is different from a multimedia playback module, which is configured to receive an adaptive data stream; decode the received data stream; and display the data stream. Whereas a graphic rendering module is for rendering graphics on the screen and not for decoding data stream and playing back the data stream on a display.

In one aspect, the method further comprises displaying a plurality of contents using a content selection user interface. Once the user selects a content from the content selection UI, the metadata for the selected content is sent to a remote server for analysis while the metadata is being rendered on a display screen by a graphic rendering engine. Upon receiving the metadata, the remote server may determine the identifying information of the content using the metadata. The remote server may also aggregate the identifying information of the content from channel applications operating on other user devices. Additionally, the aggregated identifying information (collected by the remote server) may be displayed on a display screen.

In yet another aspect, a non-transitory processor-readable medium having one or more instructions operational on a client device is disclosed herein. The instructions, which when executed by a processor causes the processor to: run a channel application located on a first layer of an operating system; receive an application interface (API) call, from the channel application, for a graphic rendering module located on a second layer of the operating system, wherein the graphic rendering module is a non-video playback module; intercept metadata sent to the graphic rendering module; determine identifying information of a content based on the intercepted metadata; and store the identifying information of the content.

In yet another aspect, a system for streaming multimedia is disclosed herein. The system includes a user device having a first memory that retains a first set of instructions to: run a channel application located on a first layer of an operating system; receive an application interface (API) call, from the channel application, for a graphic rendering module located on a second layer of the operating system, wherein the graphic rendering module is a non-video playback module; receive metadata from a media server, wherein the metadata is sent to the graphic rendering module; send the received metadata to a remote server. The system also includes a first processor, at the user device, that executes the first set of instructions. Additionally, the remote server has a second memory that retains a second set of instructions to: determine identifying information of a content based on the intercepted metadata; and store the identifying information.

Finally, the system includes a second processor, at the remote server, that executes the second set of instructions.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

DETAILED DESCRIPTION

In the following description numerous specific details are set forth in order to provide a thorough understanding of the invention. However, one skilled in the art would recognize that the invention might be practiced without these specific details. In other instances, well known methods, procedures, and/or components have not been described in detail so as not to unnecessarily obscure aspects of the invention.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

Today, more and more people are eliminating their cable and satellite services altogether to go with streaming solutions such as the Roku streaming player. The streaming option is attractive to many people for a variety of reasons including it being a cheaper alternative to cable/satellite television and the instant accessibility to thousands of programs across many different streaming platforms and providers such as Roku® channels, Netflix®, HBO GO®, and M-GO for example. Additionally, the required investment on hardware is minimal and sometime even free as the streaming software application is preloaded onto many devices.

Figure 1:
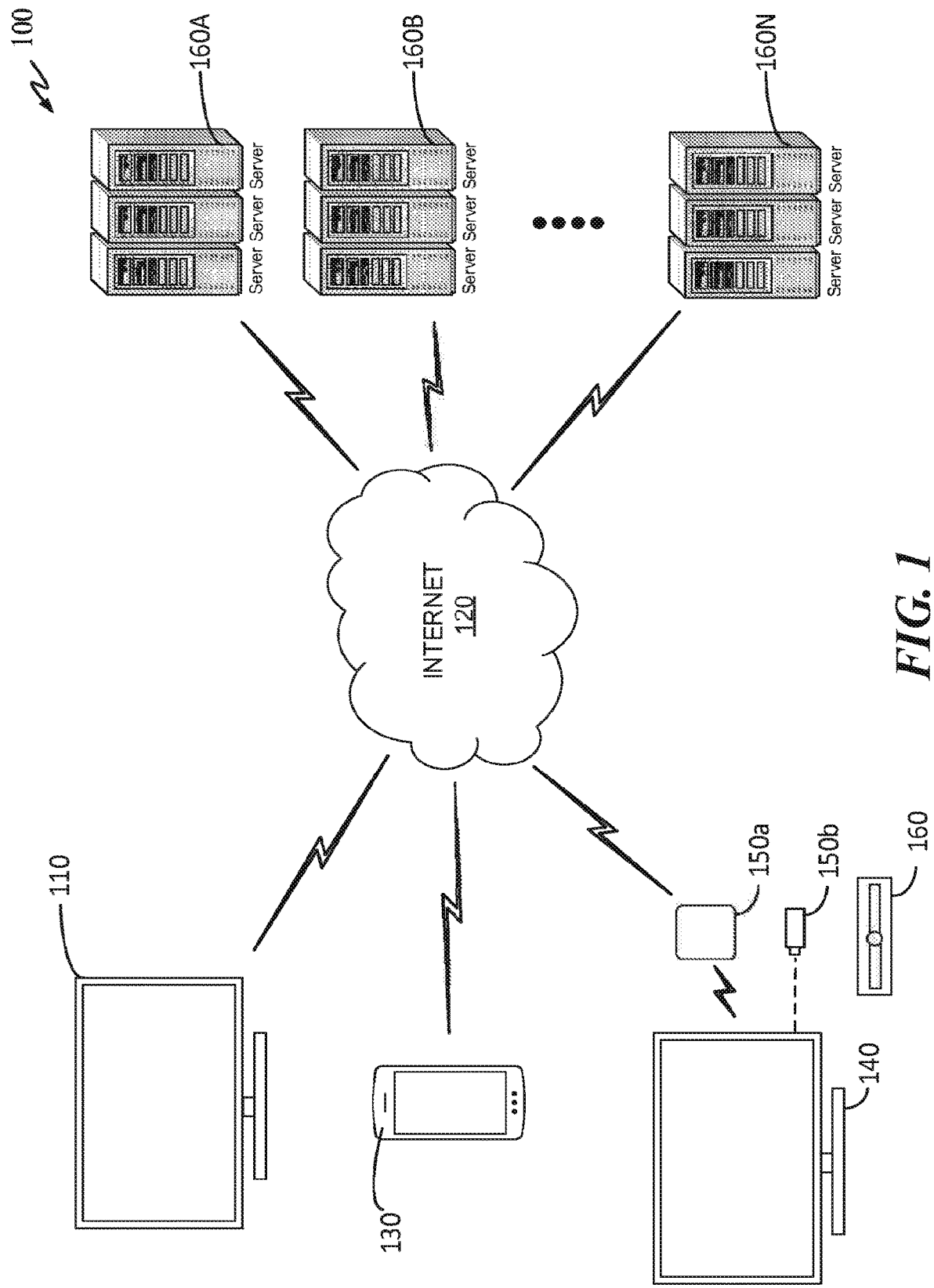
FIG. 1 illustrates an exemplary streaming environment.

FIG. 1 illustrates an exemplary streaming environment 100 common to most streaming systems. As shown in FIG. 1, environment 100 includes a television 110 such as a LED flat screen TV, the Internet 120, a user device 130 such as a mobile phone or tablet, a display device 140, streaming client devices 150a-b, and a plurality of servers 160A-160N. Television 110 may be an Internet enabled smart TV having preloaded streaming applications such as the Roku streaming application or Roku TV. For example, TCL® and Hisense® brands televisions include Roku TV right out of the box, thus enabling users to immediately stream programs from a selection of more than 1000+ channels straight to their televisions without the need to purchase any additional hardware or software. Once the streaming application (e.g., Roku TV) is executed, it communicates with one or more content servers 160a-160n via Internet 120 to request and receive streaming program/content for display on television 110.

User device 130 may be a smartphone, a tablet, or any other suitable mobile devices with the ability to access the Internet or broadband wireless such as 4G LTE, 5G, or any other suitable wireless communication standard. User device 130 may include a streaming application such as Roku mobile App (not shown) to enable it to stream contents from one or more servers 160a-n via the Internet to user device 130, television 110, or display device 140.

Streaming contents may also be delivered to a display device such as display device 140 using a streaming player 150a or streaming stick 150b. Each of streaming player 150a and streaming stick 150b is connected to an audio/video input (e.g., HDMI, MHL) of display device 140. In this set up, all of the software applications needed for streaming and video decoding reside on streaming player 150a or streaming stick 150b. An exemplary streaming player 150a is the Roku 3, and an exemplary streaming stick 150b is the Roku Streaming Stick.

Environment 100 may also include a traditional cable or satellite set-top-box (STB) 160 configured to stream multimedia from the Internet. This is often referred to as over the top (OTT) content delivery because the main mode of content delivery for STB 160 is accomplished via cable or satellite. Most cable and satellite providers (e.g., DISH and DirecTV) provide some form of data analytic reports such as most watched programs and what's hot feature to users by configuring the STBs to continuously collect and send back data on the state of the STBs. However, these STBs can only collect programming data (i.e., currently watched program) while the user is running the native program guide (i.e., the interactive/electronic program guide (EPG)) and only for broadcast programming (not for OTT content nor $3^{rd}$ party applications). Additionally, traditional STBs are only set up to collect content data by directly querying the STBs for viewing information.

Passive Data Collection

An improved data collection system is described herein. The system is configured to collect viewing data by using both active and passive data collection techniques. Viewing data may include current channel, currently watched content, previously selected channel, etc. Active data collection involves directly querying the user's device or the operating system of the user's device for viewing data. However, the direct query method is not always possible, especially in an open development environment with thousands of $3^{rd}$ party channel applications. Passive data collection involves collecting and using existing data sent by a channel application to a rendering function/engine residing on the operating system of the user's device.

Figure 2:
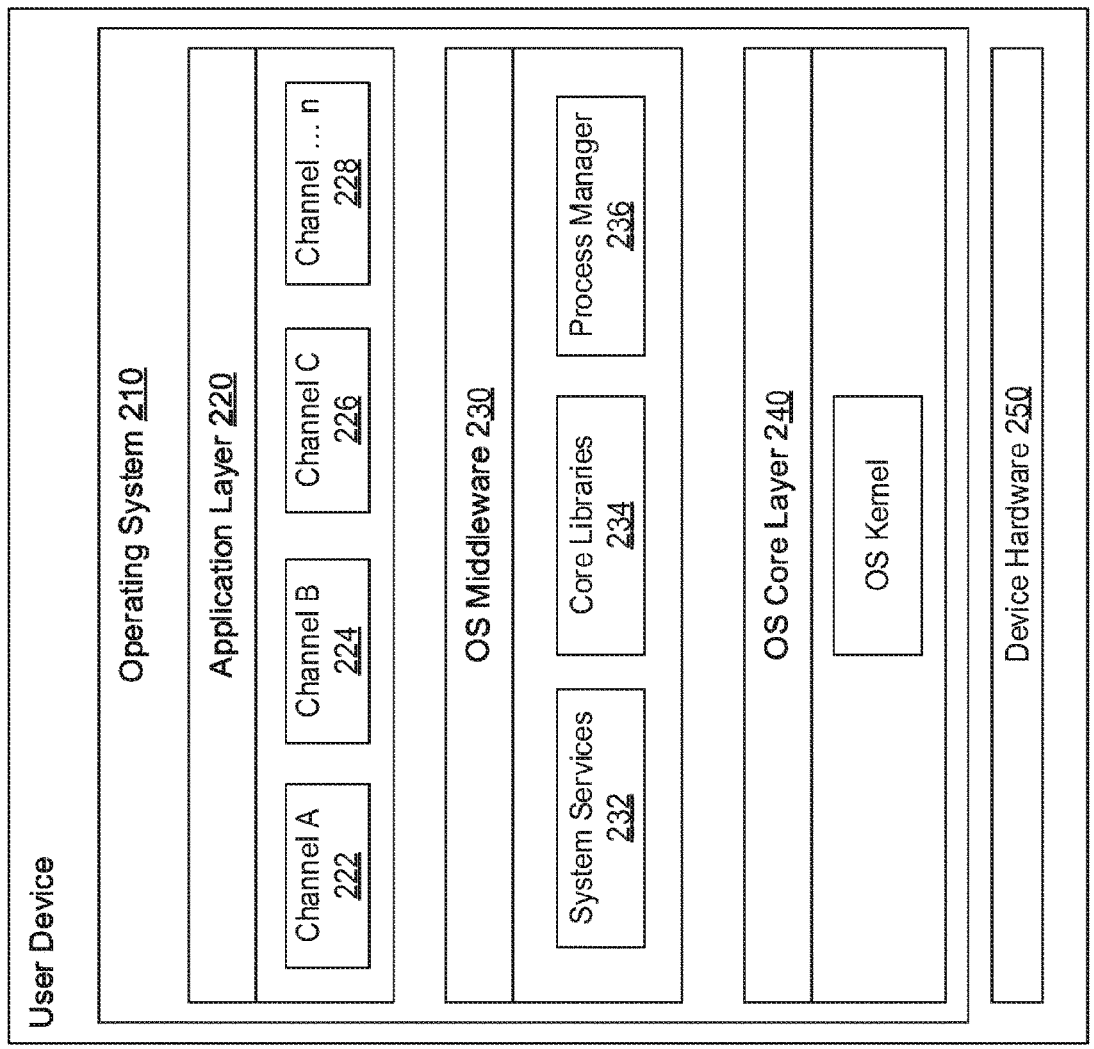
FIG. 2 illustrates an exemplary operating system in accordance to an aspect of the disclosure.

FIG. 2 illustrates an exemplary operating system 210 of a user device. Operating system 210 includes several operating system layers. The top most layer is an application layer 220. Operating system 210 also includes a middleware layer 230 and an operating system core layer 240. A hardware layer 250 of user device 200 sits below core layer 240. Application layer 220 is typically where all channel applications are installed.

To perform various functions such as video playback or graphic rendering, channel applications (222-228) are configured to make API calls to various libraries and services residing in middleware layer 230 and sometime core layer 240. The multilayered architecture is to provide proper isolation of each application in application layer 220. Application isolation is typically achieved by assigning each running application to a virtual operating environment or machine where all running processes is confined within the assigned virtual machine. This process is also referred to as sandboxing. The sandboxing process protects the application's processes and data by preventing another concurrently running application from accessing to the application's data and processes.

As shown in FIG. 2, middleware layer 230 includes library and services such as system services 232, core libraries 234, a process manager 236, and other services (not shown). Core layer 240 includes an OS kernel 242 which contains drivers for controlling various devices at a hardware layer 250 such as display screen, speakers, and wireless communication services (e.g., WiFi, near field communication, etc.).

Figure 3:
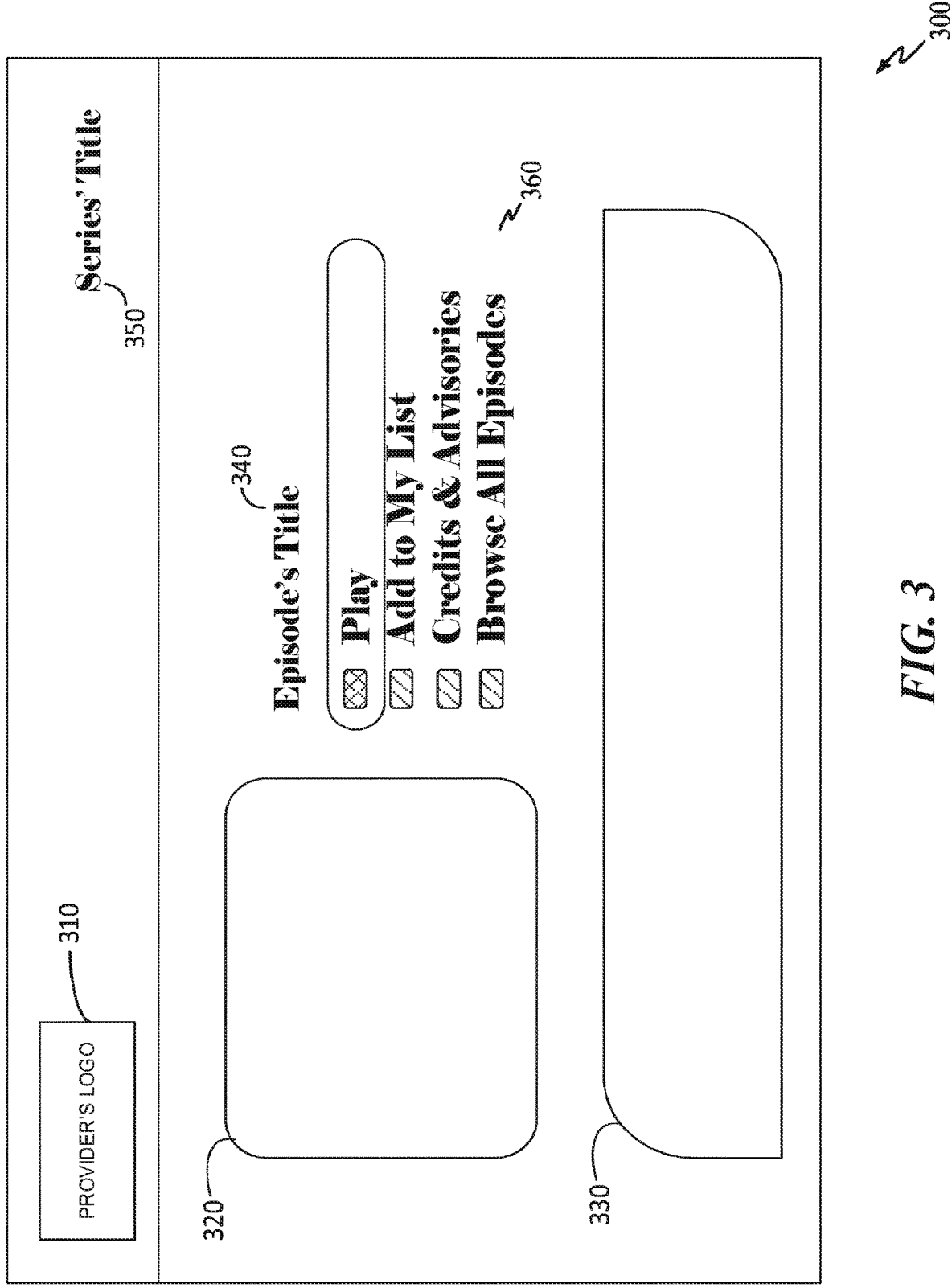
FIGS. 3-4 illustrate exemplary user interfaces of systems for collecting viewing data and determining a total view count in accordance to an aspect of the disclosure.
Figure 4:
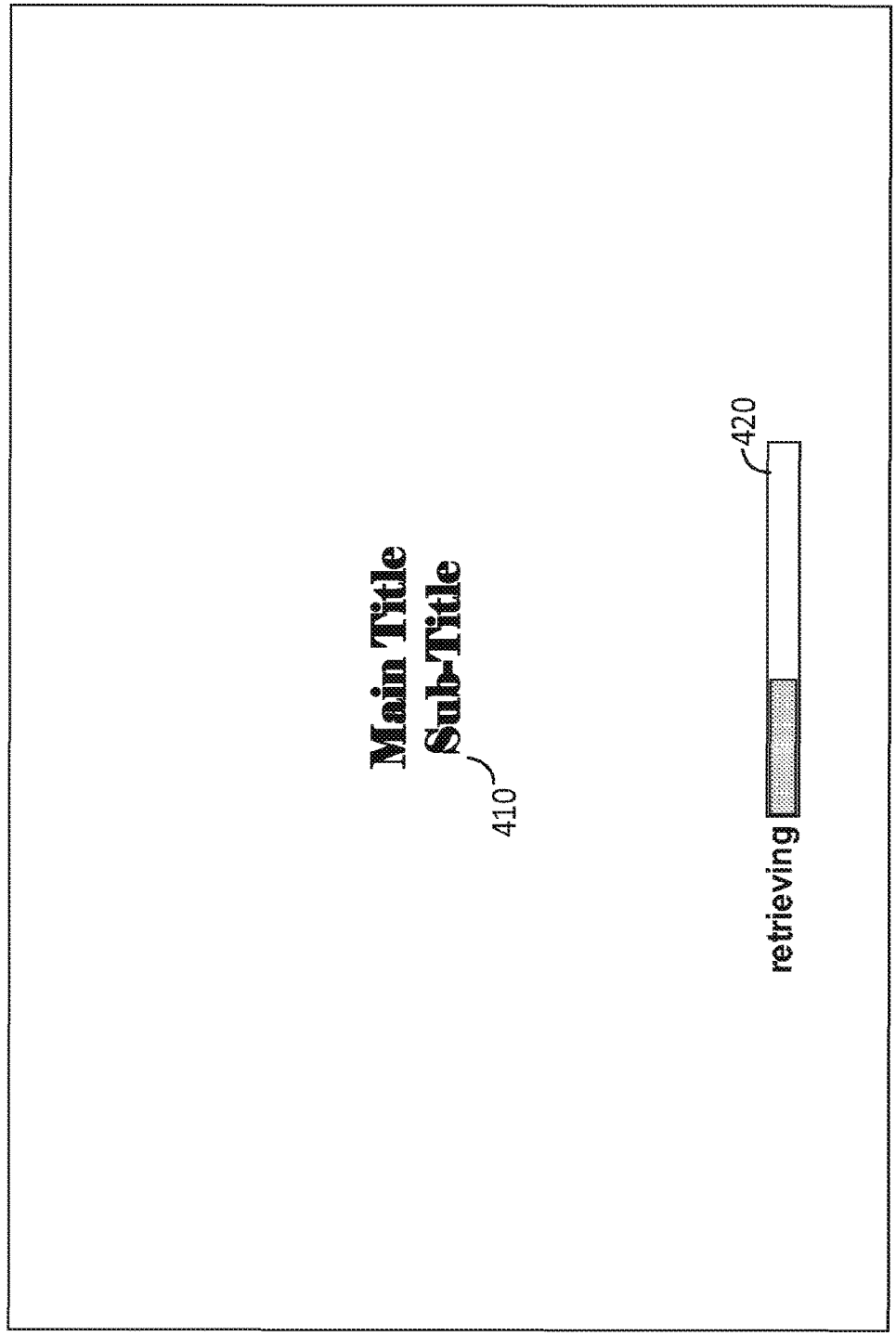

To facilitate the description of the passive data collection method, FIGS. 3-4 will be discussed in conjunction with FIG. 2. FIG. 3 illustrates an exemplary content option UI (user interface) 300 that includes a provider indication area 310, a content graphic area 320, a content information area 330, a content title area 340, a main title area 350, and a menu selection area 360. Provider indication area 310 indicates the name or source of the channel such as Showtime Anytime®. Content graphic area 320 displays relevant box art or graphic representing the content. Content information area 330 provides additional description about the content represented by graphic area 320.

Content title 340 provides the name of the movie or episode of the content. Main title area 350 provides the series name of the series of the content is part of a series. Otherwise, main title area 350 and content title 340 may contain identical data. Menu selection area 360 provides the user with options/actions the user may take including playing the content, add to future watch list, view credits and advisories, and browse all episode relating to the series.

Content option UI 300 may be a component of core libraries 234. Content option UI 300 may be generated by any channel application, running on application layer 220, using an API call to library 234 for the content option UI library component (not shown). In one aspect, when a channel application makes an API call to generate content option UI 300, it automatically forwards the metadata of fields 310-350 to the content option UI library component. Alternatively, the content option UI library component may send a request for data to the channel application for one or more fields 310-350.

Although the content option UI library component is described to be part of core libraries 234 residing in middleware layer 230, it may span more than one modules (e.g., system services 232 and libraries 234) on layer 230. Additionally, content option UI library component may span multiple layers of operating system 210 (i.e., middleware layer 230 and core layer 240). Once the content option UI library component is called, the data received from the channel application (channel metadata) for fields 310-350 is sent to a home server (not shown) for storage and analysis. The home server is the default server to which all usage and behavioral data collected by operating system 210 are sent, and it may be remotely located.

Upon receipt of the metadata for fields 310-350, the home server analyzes the metadata and matches it with a known content. This may be done by analyzing the metadata for content title area 340 and main title area 350 and corresponding the metadata to a known content and the content identifier. The home server then stores the content identifier along with the user's profile. By associating the content identifier with the user's profile, the system can form a better entertainment profile for the user. Additionally, various viewing statistics can be generated once the content identifier has been identified. Some examples of viewing statistics that could be generated are total view count (across all platforms and devices); most watched programs; most watched programs by age group, sex, geographic location, etc.

In one aspect, the home server collects channel metadata from all active user devices and determines the content identifier for each respective device. The home server then aggregates the content identifiers and generates a total view count for each content. Active user devices, in this context, include various devices across multiple platforms such as television, streaming player, streaming stick, mobile devices, etc. The home server may also send the total view count back to the user device for display. The user device may display the view count during the playback of the content. For example, the user device may be streaming season 2, episode 3 of Breaking Bad, during the streaming of the content, the user device receives the view count data (for S02E03) across all devices and platforms from the home server and displays it to the user. For example, FIG. 4 illustrates a buffering UI 400 that includes a title area 410 and a buffering status indication area 420. Buffering UI 400 may be launched by a channel application to inform the user that the selected content is buffering and is starting momentarily. In one aspect, buffering UI 400 is generated by a graphic rendering module, which may be a component of system services 232, libraries 234, or both. For example, buffering UI 400 may be generated by a QLabel function, which is a widget of the Qt® platform. On a high level, Qt is a cross-platform application development toolkit that enable developers to code once (and compile) and run on various platforms such as Windows, Android, Mac OS, and Linux.

In another aspect, buffering UI 400 may be generated by a lower layer graphic rendering module which may have one or more components residing in kernel layer 240 (including a thin layer at application layer 210 in order to expose the API functions of the graphic rendering module). For example, the channel application may generate buffering UI 400 by making API calls directly to a graphic rendering engine such as a DirectFB (direct frame buffer) module or an OpenGL module. When the channel application makes an API call to the DirectFB or the OpenGL graphic rendering module, it also passes along the metadata for title area 410, which is also forwarded to the home server. The metadata for title area 410 may be automatically forward to the home server by the DirectFB or OpenGL API module. Once the home server receives the metadata for title area 410, it analyzes the metadata to determine a content identifier that corresponds with the metadata.

Figure 5:
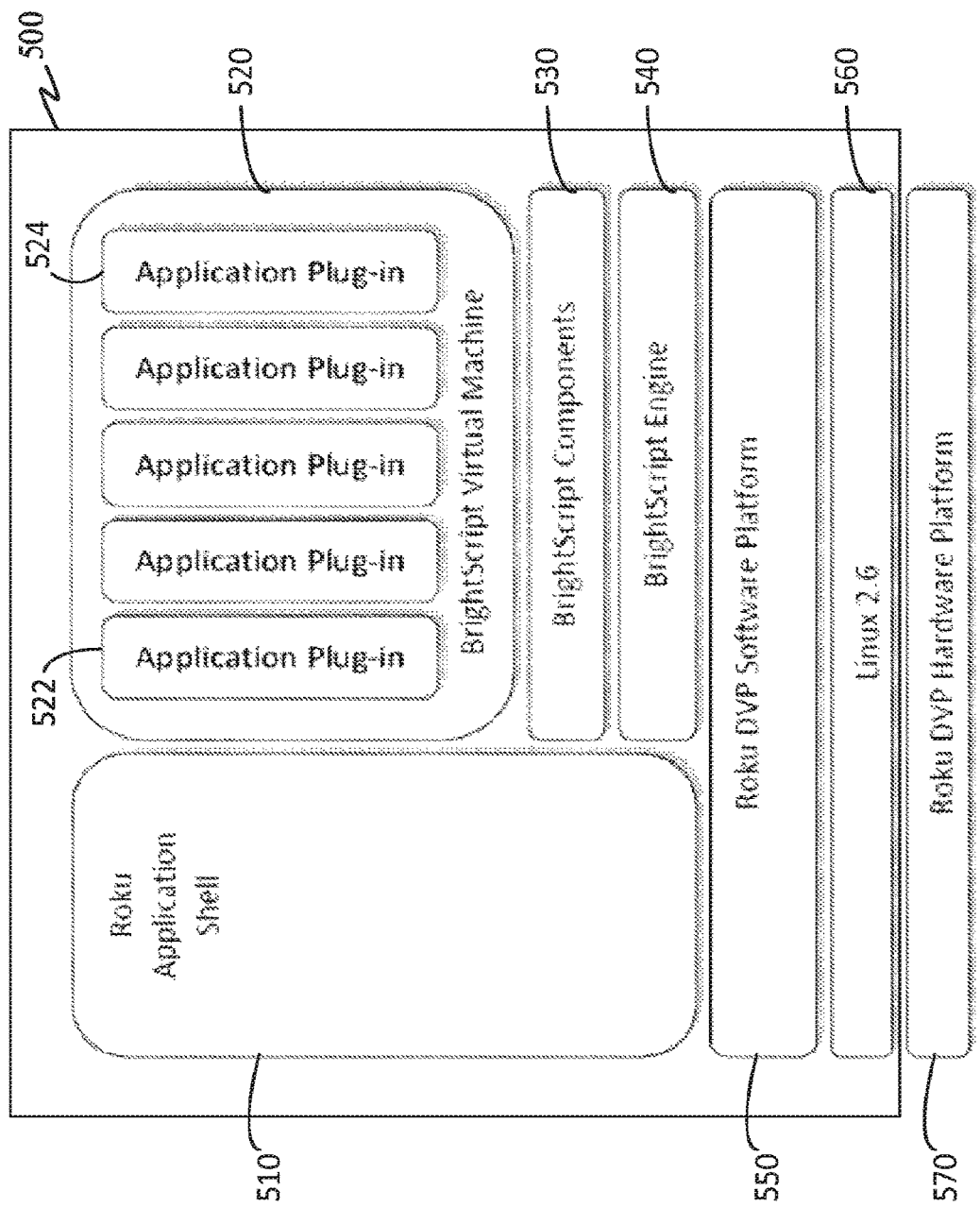
FIG. 5 illustrates an exemplary operating system in accordance to an aspect of the disclosure.

FIG. 5 illustrates an exemplary operating system 500 in which aspects of the disclosure can be implemented. Operating system 500 may reside on streaming client devices 150a-150b and television 110, for example. Operating system 500 includes an application shell 510, an application layer 520, a BrightScript components module 530, a BrightScript engine module 540, a software platform layer 550, and a kernel layer 560. Kernel layer 560 sits directly on top of a hardware layer 570 to manage and interact with various hardware components such as memory, device drivers, security, networking services, etc.

BrightScript component module 530 and engine module 540 may be part of the framework and runtime layer of operating system 500. Application shell 510 may reside on multiple layers such as application layer 520, the framework layer, and the runtime layer. In one aspect, application shell 510 serves as a translation layer for communication between applications, libraries components, and system resources at the kernel layer.

Application layer 520 is where $3^{rd}$ party channel applications reside such as channel applications 522 and 524. At runtime, each channel application is assigned its own virtual machine, which operates as an independent operating system running within host operating system 500. For example, application channel 522 operates within its own virtual machine that is independent and separate from channel application 524, which also operates within the confine of its own virtual machine. The virtual machine is configured to run any application plug-in (or channel application) as if it is operating on top of its own physical machine. Since a channel application is required to run within the boundary of its own virtual machine, the processes and data of the channel application are protected from other concurrently running channel applications. Data cannot be shared between channel applications unless express permission is granted by the user.

In one aspect, the content option UI library component described with respect to FIG. 3 resides within BrightScript components module/layer 530 and BrightScript engine 540. Examples of graphic rendering BrightScript components are roSpringboardScreen, roVideoScreen, and roImageCanvas. Each of the roSpringboardScreen, roVideoScreen, and roImageCanvas components requires certain metadata from the API calling channel application in order to render the appropriate information on the user's display. One or more of the following metadata may be required by a graphic rendering BrightScript component: ContentType, Title, TitleSeason, Description, StreamURLs, StreamContentIDs, StreamFormat, Length, Actors, Directors, Categories, etc. It should be noted that this list is not exhaustive.

Each of the BrightScript component may be configured to automatically forward any metadata received from the API calling channel application to the home server. In essence, the metadata is intercepted or captured for the home server. In this way, the home server can analyze the metadata to determine the corresponding content identifier, which is a unique identifier assigned to each television episode, movie, clip, etc.

Figure 6:
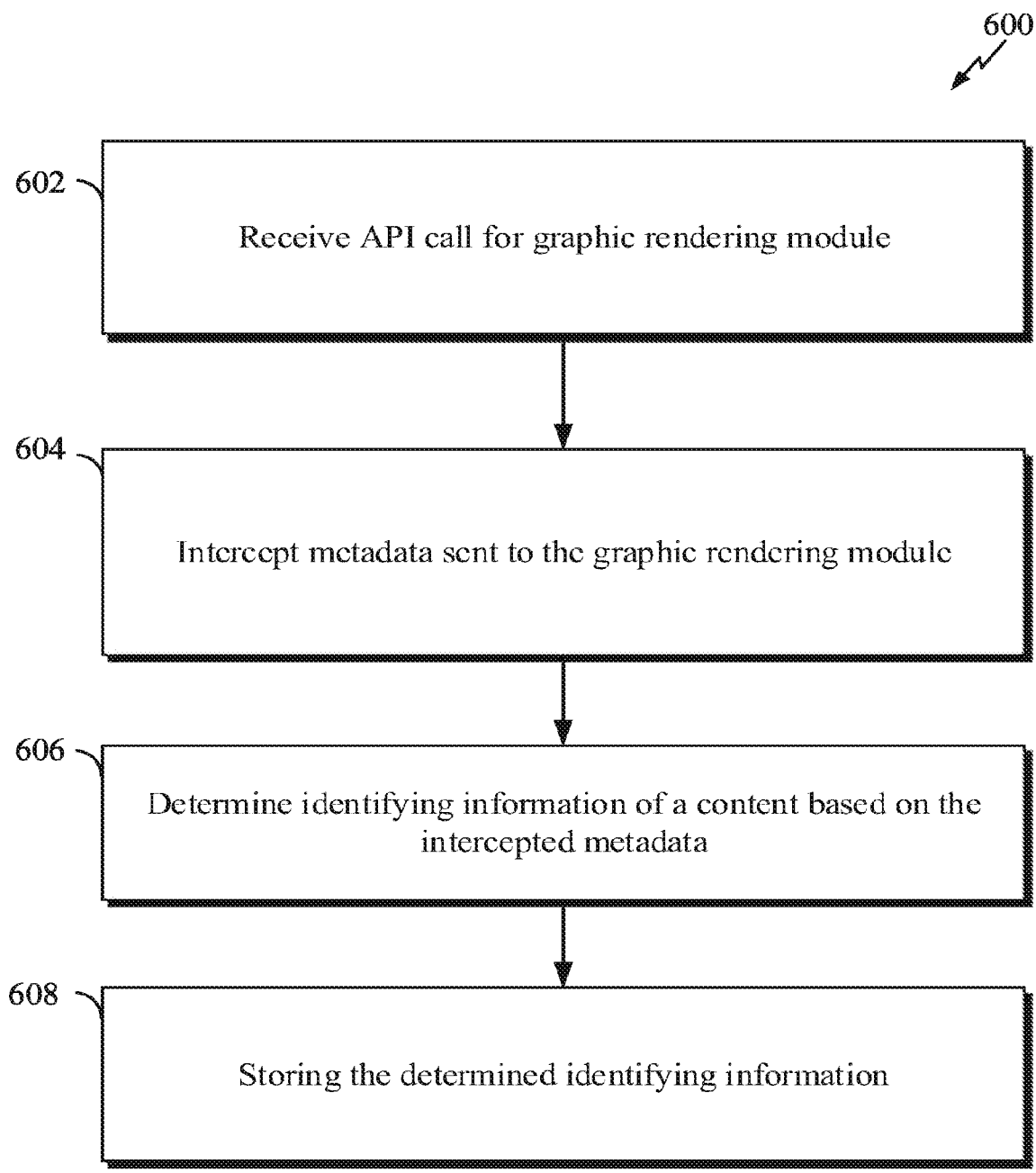
FIGS. 6-7 illustrates exemplary processes for collecting viewing data and determining a total view count in accordance to an aspect of the disclosure.

FIG. 6 illustrates an exemplary process 600 for collecting viewing data and implicitly determining what the user is currently watching in accordance to one aspect of the disclosure. Process 600 starts at 602 where an API call is received by a graphic rendering module. In one aspect, the graphic rendering module is the content option UI library component as described in FIG. 2. In another aspect, the graphic rendering module is a graphic rendering engine such as a DirectFB engine or an OpenGL engine. At 604, the metadata sent to the graphic rendering engine by the channel application are intercepted and sent to the home server for analysis. At 606, the identifying information, which may be a unique content identifier, is determined from the intercepted metadata. In one aspect, the intercepted metadata is analyzed locally at the user device to determine the unique content identifier of the content being referenced by content option UI 300 or buffering UI 400. At 608, the identifying information is stored and used to generate various viewing statistics such as total view count in real-time, all time total view count, view count by platform, etc.

Figure 7:
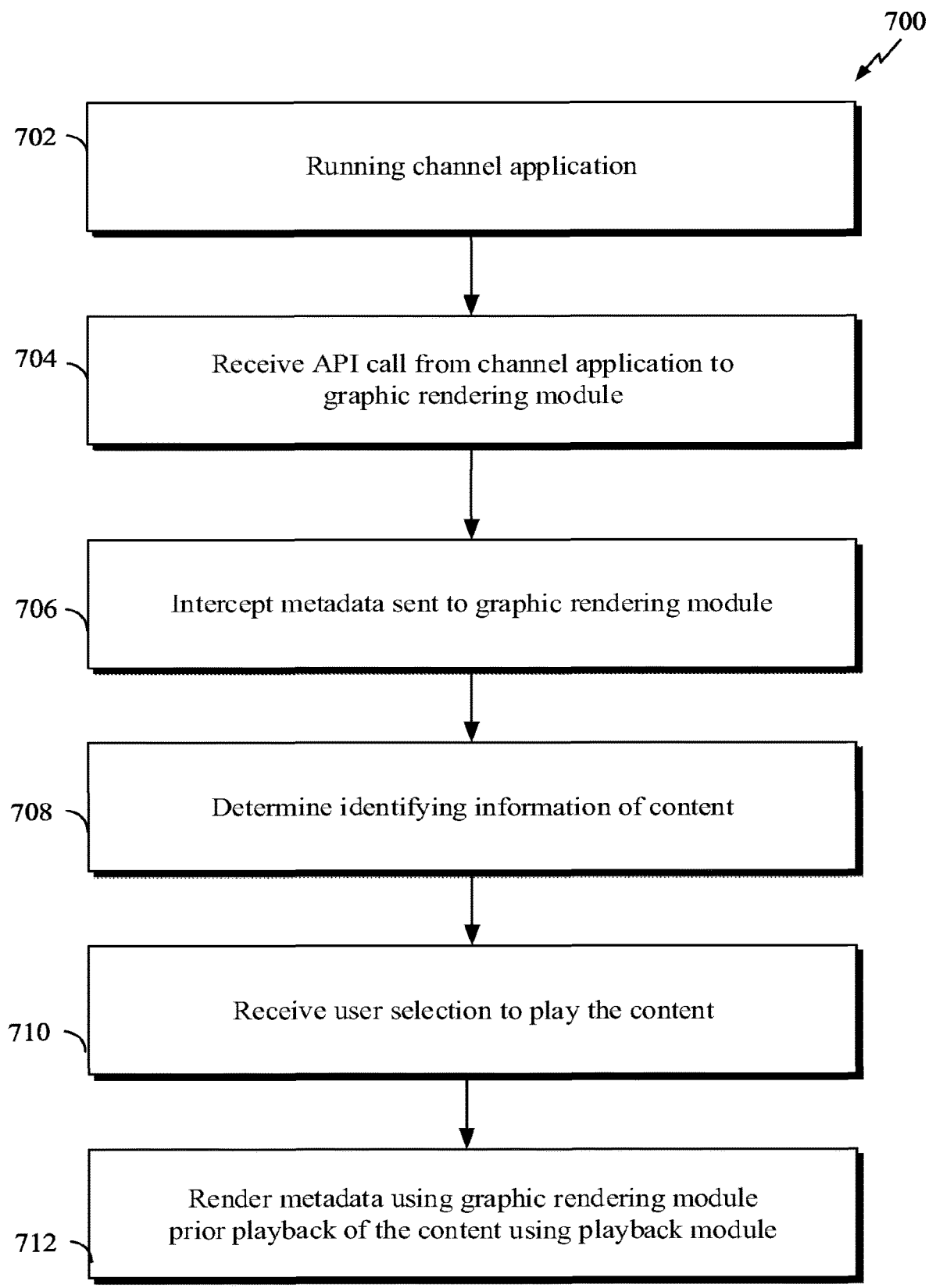

FIG. 7 illustrates an exemplary process 700 for collecting viewing data in accordance to one aspect of the disclosure. Process 700 starts at 702 where a channel application is executed. An example of a channel application is HBO GO® or M-GO. At 704, the channel application makes an API call to the graphic rendering module in response to the user selection of a content. FIGS. 3-4 are examples of UI being rendered by one of the graphic rendering modules after a user makes a content selection. Whether content option UI 300 or buffering UI 400 is rendered depends on the UI architecture of the channel application. In one aspect, when the user makes a selection of a content (from a plurality of contents), content option UI 300 is immediately rendered to provide the user with a variety of options as indicated by option area 360. In one aspect, buffering UI 400 is rendered after the user selects "Play" in option area 360 (at 710, which will be further discussed below).

Figure 10:
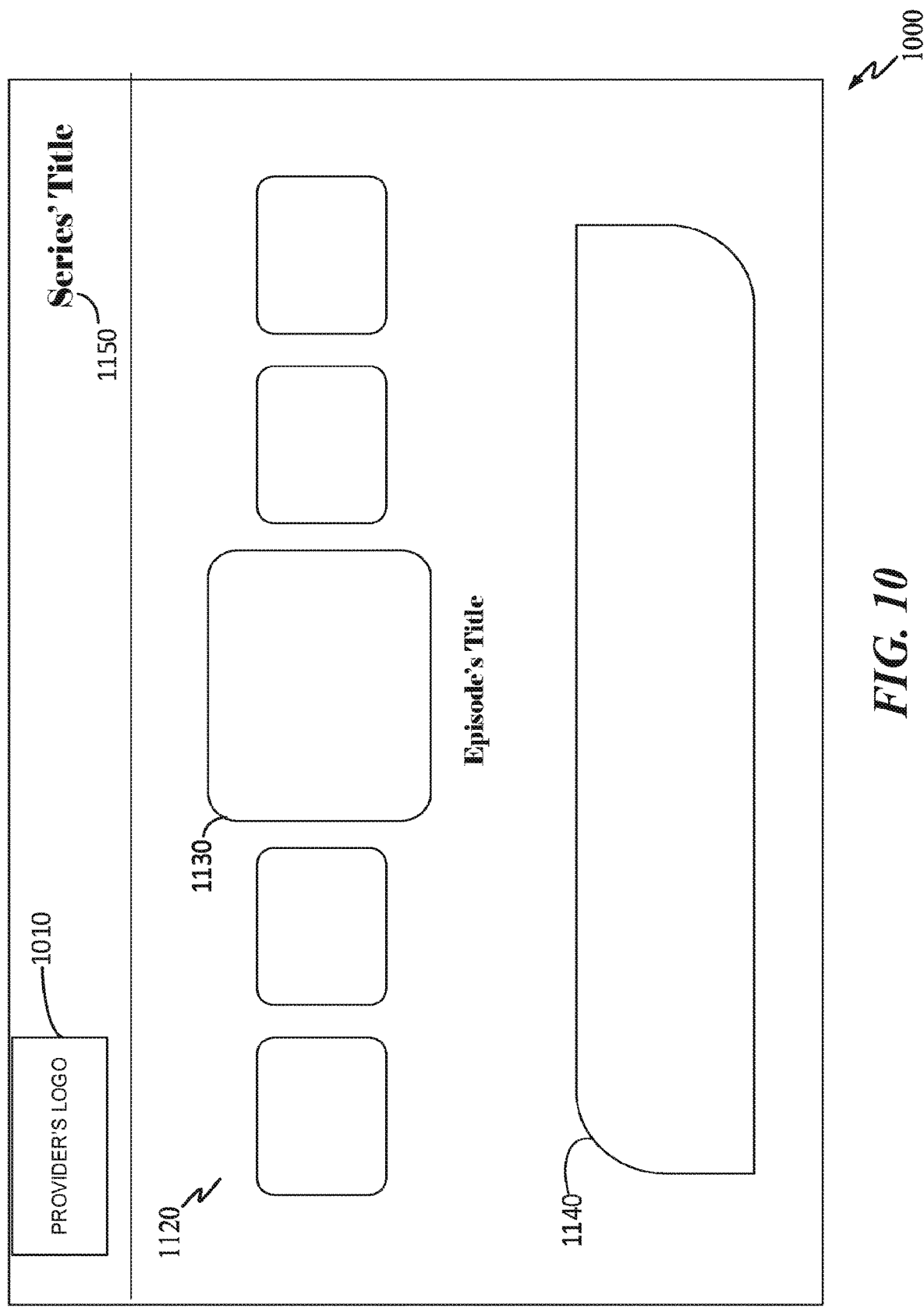
FIG. 10 illustrates an exemplary user interface.

In one aspect, buffering UI 400 is rendered immediately after the user selects the content from a plurality of contents in a content selection UI 1000 as shown in FIG. 10. Referring now to FIG. 10, which illustrates an exemplary content selection UI 1000 that includes a provider's indication area 1010, a list of contents in a panel format 1120, a currently highlighted content 1130, and a description area 1140 of highlighted content 1130. Alternatively, content selection UI 1000 may be a simple list of content items from which the user can select.

Referring again to FIG. 7, at 706, the metadata sent to the graphic rendering module is intercepted and forwarded to a remote server where the identifying information of the selected content is determined. As previously mentioned, the identifying information may be a unique identifier that identifies the exact movie or episode of the show. For example, an identifier determining module (not shown) is configured to generate a unique identifier such that it would distinguish the classic 1953 War of the Worlds movie from the 2005 War of the Worlds remake, and any other remake hereafter. At 710, a user selection to play the content is received. Once this occurs, process 700 renders the metadata (intercepted at 706) and displays it in buffering UI 400. For example, if the user selects to play the 2005 War of the Worlds movie, graphic rendering module would render the title of the movie in main title area 410 of buffering UI 400 using the metadata received at 706. Only after displaying buffering UI 400, the channel application would playback the selected content using an audio/video playback module. In one aspect, an audio/video playback module is roVideoScreen—a BrightScript video playback component. Alternatively, the audio/video playback module is Stagefright, which is a native level Android media playback engine. It should be noted that a channel application does not need to render both the content option UI 300 and the buffering UI 400. The channel application may only render buffering UI 400 immediately after the content is selected from content selection UI 1000.

Figure 8:
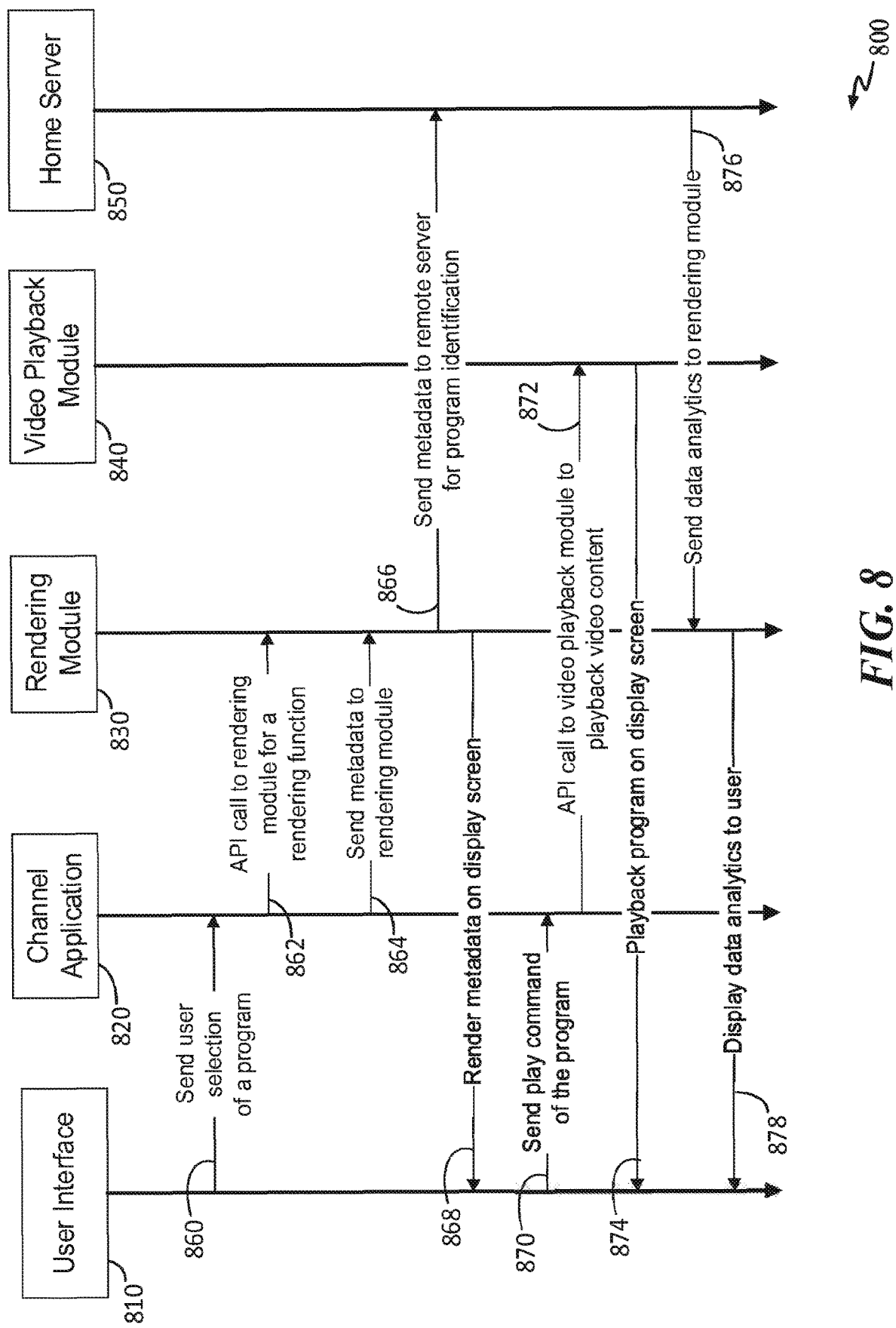
FIGS. 8-9 illustrate exemplary user communication processes of systems for collecting viewing data and determining a total view count in accordance to an aspect of the disclosure.

FIG. 8 illustrates a communication process flow 800 between various devices and software modules in accordance with one aspect of the disclosure. Communication process 800 includes a user interface 810, a channel application 820, a graphic rendering module 830, a video playback module 840, and a home server 850. User interface 810 may be displayed by television 110, streaming player 150*a*, or streaming stick 150*b*. User interface 810 may be content option UI 300 or content selection UI 1000. At 860, a user selection of a content is made via content UI 300, for example. The content selection is then sent to the underlining channel application 820 running content UI 300. At 862, channel application 820 makes an API call to graphic rendering module 830. In one aspect, during the API call, channel application 820 also sends all of the metadata relating to the selected content at 860. Alternatively, at 864, the metadata is sent to the rendering module in a separate process.

At 866, the metadata received by rendering module 830 is sent to a remote home server 850. Home server 850 is the default server to which a plurality of user devices 130, 150*a*, and 150*b* send metadata for collection and analysis. There may be multiple home servers 850 to serve various geographic locations. Once the metadata is received by home server 850, the metadata is analyzed to determine the identifying information of the content.

At 868, rendering module 830 renders the received metadata on the display screen of the user interface. In one aspect, rendering module 830 renders content option UI 300 in response to the user selection of a content. At 870, the user selects a content to be played/streamed. The play command is then sent to channel application 820, which in turn makes an API call to video playback module 840 (at 872) to playback the selected content received from a streaming server (not shown). At 874, the selected content is streamed to user interface 810 or a user's display screen.

At 876, home server 850 send data analytics results to rendering module 830, which subsequently renders the data analytics results to the user on a display screen at 878. In one aspect, home server 850 aggregates metadata from all active user devices configured to collect data as described by processes 600 and 700. For example, home server 850 may determine that there are 120,000 other viewers currently watching the same content as the user. Since the user may find this form of data analytics to be interesting, the data analytics results may be displayed to the user as an overlay while the user is watching the streamed content.

It should be noted that buffering UI 400 may also be rendered by rendering module 830 just before video playback module 840 decodes the data stream and displays the content on a display screen of user interface 810. In this way, the user may be informed of the content's title and the buffering status.

Figure 9:
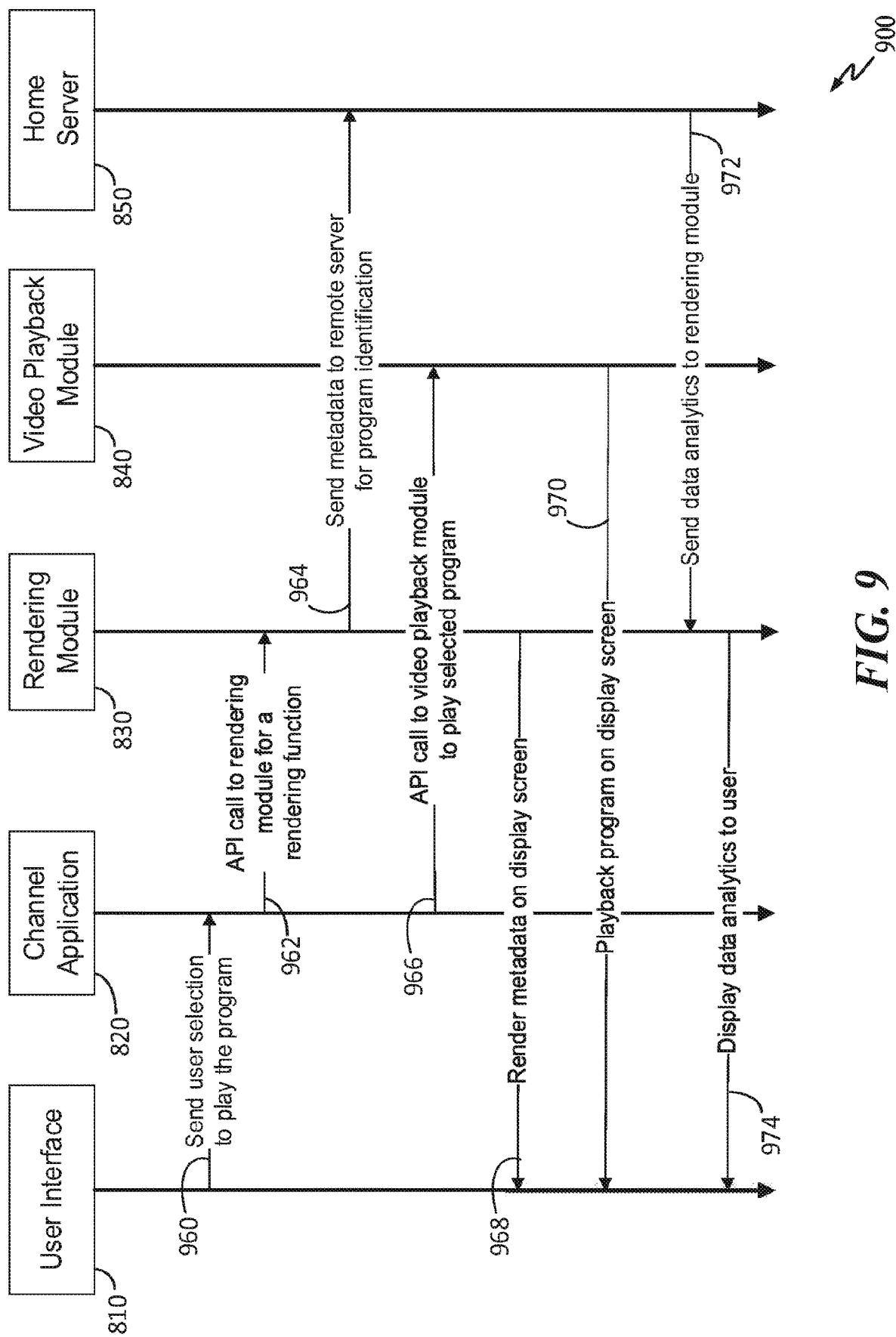

FIG. 9 illustrates a communication process flow 900 between various devices and software modules in accordance with one aspect of the disclosure. Process flow 900 starts at 960 when the user selection of a content is received by channel application 820. At 962, channel application 820 makes an API call to rendering module 830. The metadata related to the selected content at 960 is also sent to rendering module 830 through the API call. At 964, the metadata is sent to home server 850 for storage and analysis. At 966, channel application 820 makes another API call to video playback module 840 and instructs it to buffer and stream the selected content. At 968, prior to streaming the selected content on a display screen, rendering module 830 renders the metadata received at 962 on the display screen. In one aspect, buffering UI 400 is rendered by rendering module 830 at 968. It should be noted that steps 966 and 968 can be executed in reversed as long as step 968 is executed before step 970.

At 970, the selected content (at 960) is displayed on the display screen of user device/interface 810. At 972, home server sends the data analytics results to rendering module 830 for rendering as an overlay graphic on the display screen at 974. It should be noted that the analysis of the metadata to determine the unique identifier of the selected content may be done locally by user device 810.

Exemplary Hardware Implementation

Figure 11:
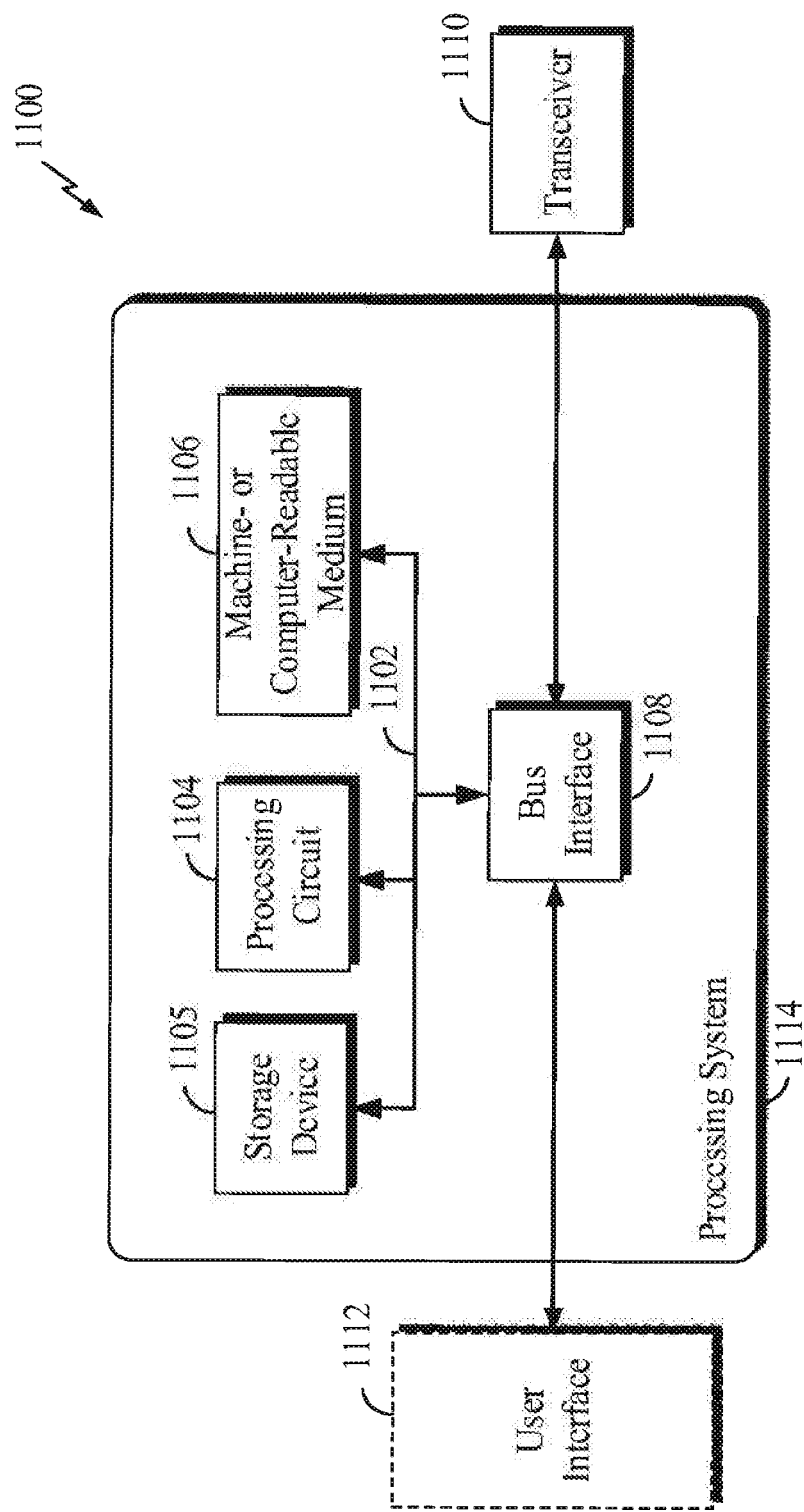
FIG. 11 is a block diagram illustrating an example of a hardware implementation for an apparatus employing a processing system that may exploit the systems and methods of FIGS. 3-10 in accordance to an aspect of the disclosure.

FIG. 11 illustrates an overall system or apparatus 1100 in which the systems, methods and apparatus of FIGS. 1-10 may be implemented. In accordance with various aspects of the disclosure, an element, or any portion of an element, or any combination of elements may be implemented with a processing system 1114 that includes one or more processing circuits 1104. Processing circuits 1104 may include microprocessing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionality described throughout this disclosure. That is, the processing circuit 1104, as utilized in the apparatus 1100, may be used to implement any one or more of the processes described above and illustrated in FIGS. 6-9 such as processes for collecting viewing data and determining a unique content identifier.

In the example of FIG. 11, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links various circuits including one or more processing circuits (represented generally by the processing circuit 1104), the storage device 1105, and a machine-readable, processor-readable, processing circuit-readable or computer-readable media (represented generally by a non-transitory machine-readable medium 1106.) The bus 1102 may also link various other circuits such as timing sources, peripherals, voltage regulators, and power management circuits, which are well known in the art, and therefore, will not be described any further. The bus interface 1108 provides an interface between bus 1102 and a transceiver 1110. The transceiver 1110 provides a means for communicating with various other apparatus over a transmission medium. Depending upon the nature of the apparatus, a user interface 1112 (e.g., keypad, display, speaker, microphone, joystick) may also be provided.

The processing circuit 1104 is responsible for managing the bus 1102 and for general processing, including the execution of software stored on the machine-readable medium 1106. The software, when executed by processing circuit 1104, causes processing system 1114 to perform the various functions described herein for any particular apparatus. Machine-readable medium 1106 may also be used for storing data that is manipulated by processing circuit 1104 when executing software.

One or more processing circuits 1104 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 1106. The machine-readable medium 1106 may be a non-transitory machine-readable medium. A non-transitory processing circuit-readable, machine-readable or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 1106 may reside in the processing system 1114, external to the processing system 1114, or distributed across multiple entities including the processing system 1114. The machine-readable medium 1106 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system. For example, the machine-readable storage medium 1106 may have one or more instructions which when executed by the processing circuit 1104 causes the processing circuit to: receive, from an application, a request to access the input data; determine a coordinate of the input data; determine a status of the requesting application; and grant the request for access to the input data based on the determined coordinate and the status of the requesting application.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

The various illustrative logical blocks, modules, circuits, elements, and/or components described in connection with the examples disclosed herein may be implemented or performed with a general purpose processing circuit, a digital signal processing circuit (DSP), an application specific integrated circuit (ASIC), a field programmable gate array (FPGA) or other programmable logic component, discrete gate or transistor logic, discrete hardware components, or any combination thereof designed to perform the functions described herein. A general purpose processing circuit may be a microprocessing circuit, but in the alternative, the processing circuit may be any conventional processing circuit, controller, microcontroller, or state machine. A processing circuit may also be implemented as a combination of computing components, e.g., a combination of a DSP and a microprocessing circuit, a number of microprocessing circuits, one or more microprocessing circuits in conjunction with a DSP core, or any other such configuration.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Figure 12:
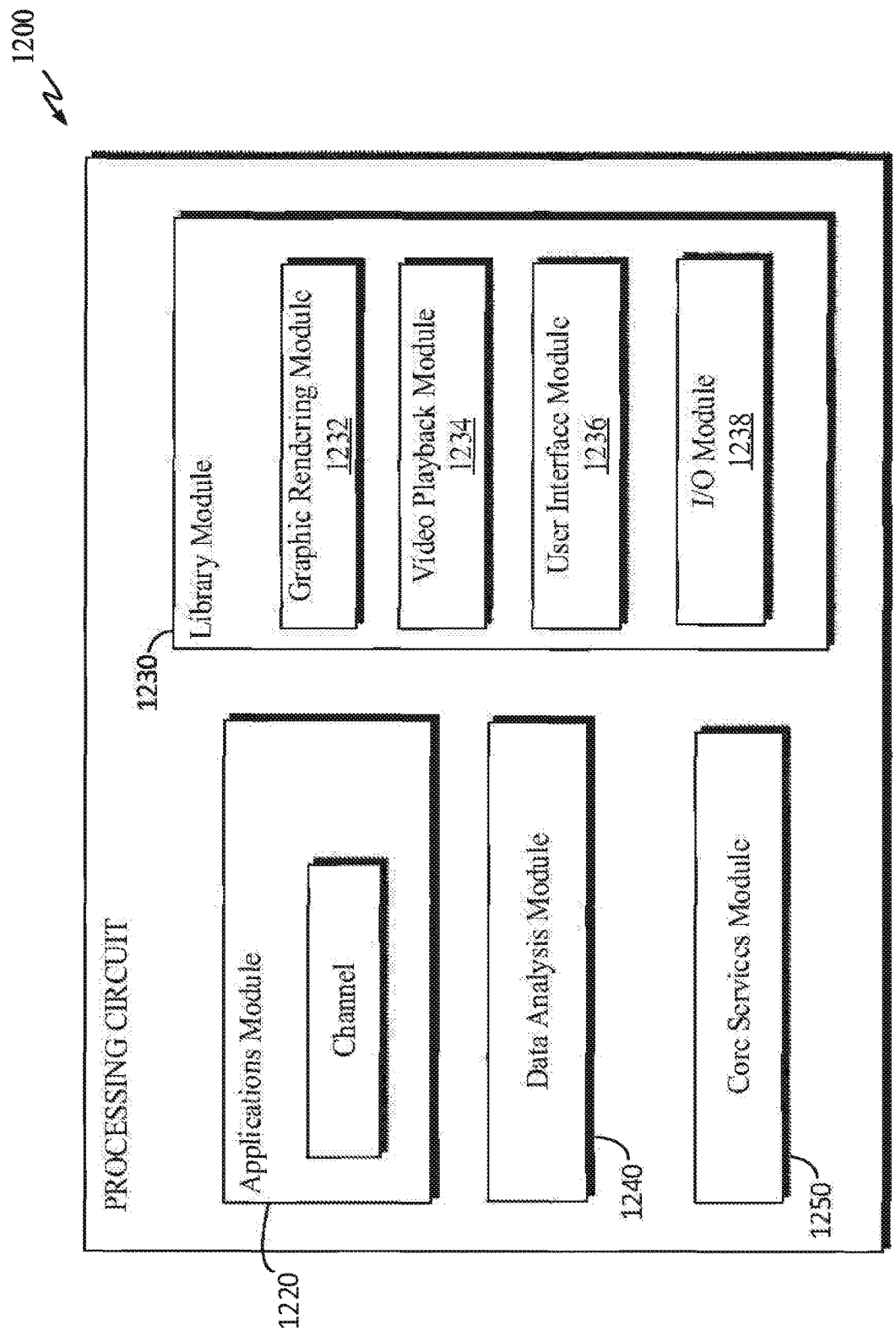
FIG. 12 is a block diagram of exemplary software modules implemented by various aspects of the disclosure.

FIG. 12 illustrates an exemplary processing circuit 1200 configured to implement various aspects of the present disclosure. Processing circuit 1200 includes an applications module 1220, a library module 1230, a data analysis module 1240, and a core services module 1240. Library module 1230 includes graphic rendering module 1232, video playback module 1234, user interface module 1236, and an I/O module 1238. One or more of modules 1220-1250 contain instructions and algorithms to execute process 600 of FIG. 6, process 700 of FIG. 7, communication process 800 of FIG. 8, and communication process 900 of FIG. 9. Additionally, one or more of modules 1220-1250 may contain instructions to generate content option UI 300, buffering UI 400, and content selection UI 1000. Additionally, processing circuit 1200 may include one or more functions of processing circuit 1104.

Although not shown, processing circuit 1200 may include a memory device that is readable by processing circuit 1200. In one aspect, the memory device may be an on-chip memory device that contains all instructions for each of modules 1220-1250 that enable processing circuit 1200 to execute processes 600, 700, 800, and 900 and to render user interfaces 300, 400, and 1000.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled, in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A computer-implemented method, comprising:
   running, by at least one computer processor, in an environment capable of running third-party applications, a first application in a first sandboxed virtual operating environment of a user device, wherein the first application comprises channel metadata that cannot be shared with a second application outside the first application without express permission granted by a user of the user device;
   receiving a call, from the second application in a second sandboxed virtual operating environment of the user device, for a module, wherein the module is a non-video playback module comprising graphic rendering logic;
   intercepting metadata sent to the module;
   determining identifying information of a content instance based on the intercepted metadata;
   generating statistics related to the content by analyzing the intercepted channel metadata with respect to the content and at least one aggregate content identifier;
   forming an entertainment profile for the user by associating the identifying information with a user profile on the user device; and
   storing the determined identifying information of the content instance, the statistics related to the content instance, the entertainment profile for the user, and a relation of the determined identifying information of the content instance to the entertainment profile for the user.

2. The method of claim 1, further comprising rendering one or more of the channel metadata sent to the module on a display screen using the module, prior to multimedia playback of a received data stream.

3. The method of claim 1, further comprising receiving a user selection of the content instance from a plurality of content instances, wherein the intercepted metadata is sent by the first application and is based on the content instance selected by the user selection.

4. The method of claim 1, further comprising:
   determining, for a plurality of other user devices, at least one other content identifier corresponding to the content instance, for at least one other user device of the plurality of other user devices, to form a plurality of the other content identifiers corresponding to the content instance;
   aggregating the plurality of the other content identifiers corresponding to the content instance, to create the at least one aggregate content identifier; and
   displaying the at least one aggregate content identifier.

5. The method of claim 4, wherein the at least one aggregate content identifier includes a most-watched program ranking based at least in part on a view-count statistic.

6. The method of claim 5, wherein the most-watched program ranking is specific to a viewer demographic.

7. The method of claim 1, wherein the channel metadata comprises at least one of a title of the content, director, cast, or studio information, and wherein the statistics related to the content instance comprise a view count of the content for a plurality of other user devices.

8. The method of claim 7, wherein the view count comprises a current view count, a cumulative view count, a view count by platform, or a combination thereof.

9. A non-transitory computer-readable storage medium having one or more instructions operational on a client device, which when executed by at least one computer processor, cause the at least one computer processor to perform operations comprising:
   running, in an environment capable of running third-party applications, a first application in a first sandboxed virtual operating environment of a user device, wherein the first application comprises channel metadata that cannot be shared with a second application outside the first application without express permission granted by a user of the user device;
   receiving a call, from the second application in a second sandboxed virtual operating environment of the user device, for a module, wherein the module is a non-video playback module comprising graphic rendering logic;
   intercepting metadata sent to the module;
   determining identifying information of a content instance based on the intercepted metadata;
   generating statistics related to the content by analyzing the intercepted metadata with respect to the content and at least one aggregate content identifier;
   forming an entertainment profile for the user by associating the identifying information with a user profile on the user device; and
   storing the determined identifying information of the content instance, the statistics related to the content instance, the entertainment profile for the user, and a relation of the determined identifying information of the content instance to the entertainment profile for the user.

10. The non-transitory computer-readable storage medium of claim 9, the operations further comprising rendering one or more of the channel metadata sent to the module on a display screen using the module, prior to multimedia playback of a received data stream.

11. The non-transitory computer-readable storage medium of claim 9, the operations further comprising receiving a user selection of the content instance from a plurality of content instances, wherein the intercepted metadata is sent by the first application and is based on the content instance selected by the user selection.

12. The non-transitory computer-readable storage medium of claim 9, the operations further comprising:
determining, for a plurality of other user devices, at least one other content identifier corresponding to the content instance, for at least one other user device of the plurality of other user devices, to form a plurality of the other content identifiers corresponding to the content instance;
aggregating the plurality of the other content identifiers corresponding to the content instance, to create the at least one aggregate content identifier; and
displaying the at least one aggregate content identifier.

13. The non-transitory computer-readable storage medium of claim 12, wherein the at least one aggregate content identifier includes a most-watched program ranking based at least in part on a view-count statistic, and wherein the most-watched program ranking is specific to a viewer demographic.

14. The non-transitory computer-readable storage medium of claim 9, wherein the channel metadata comprises at least one of a title of the content, director, cast, or studio information, wherein the statistics related to the content instance comprise a view count of the content for a plurality of other user devices, and wherein the view count comprises a current view count, a cumulative view count, a view count by platform, or a combination thereof.

15. A system comprising:
a memory; and
at least one computer processor coupled to the memory and configured to perform operations comprising:
running, in an environment capable of running third-party applications, a first application in a first sandboxed virtual operating environment of a user device, wherein the first application comprises channel metadata that cannot be shared with a second application outside the first application without express permission granted by a user of the user device;
receiving a call, from the second application in a second sandboxed virtual operating environment of the user device, for a module, wherein the module is a non-video playback module comprising graphic rendering logic;
intercepting metadata sent to the module;
determining identifying information of a content instance based on the intercepted metadata;
generating statistics related to the content by analyzing the intercepted metadata with respect to the content and at least one aggregate content identifier;
forming an entertainment profile for the user by associating the identifying information with a user profile on the user device; and
storing the determined identifying information of the content instance, the statistics related to the content instance, the entertainment profile for the user, and a relation of the determined identifying information of the content instance to the entertainment profile for the user.

16. The system of claim 15, the operations further comprising rendering one or more of the channel metadata sent to the module on a display screen using the module, prior to multimedia playback of a received data stream.

17. The system of claim 15, the operations further comprising receiving a user selection of the content instance from a plurality of content instances, wherein the intercepted metadata is sent by the first application and is based on the content instance selected by the user selection.

18. The system of claim 15, the operations further comprising:
determining, for a plurality of other user devices, at least one other content identifier corresponding to the content instance, for at least one other user device of the plurality of other user devices, to form a plurality of the other content identifiers corresponding to the content instance;
aggregating the plurality of the other content identifiers corresponding to the content instance, to create the at least one aggregate content identifier; and
displaying the at least one aggregate content identifier.

19. The system of claim 18, wherein the at least one aggregate content identifier includes a most-watched program ranking based at least in part on a view-count statistic, and wherein the most-watched program ranking is specific to a viewer demographic.

20. The system of claim 15, wherein the channel metadata comprises at least one of a title of the content, director, cast, or studio information, wherein the statistics related to the content instance comprise a view count of the content for a plurality of other user devices, and wherein the view count comprises a current view count, a cumulative view count, a view count by platform, or a combination thereof.

* * * * *